Oct. 28, 1947.  L. DUFOUR  2,429,711
AGRICULTURAL TRACTOR OR VEHICLE
Filed Jan. 23, 1946  2 Sheets-Sheet 1
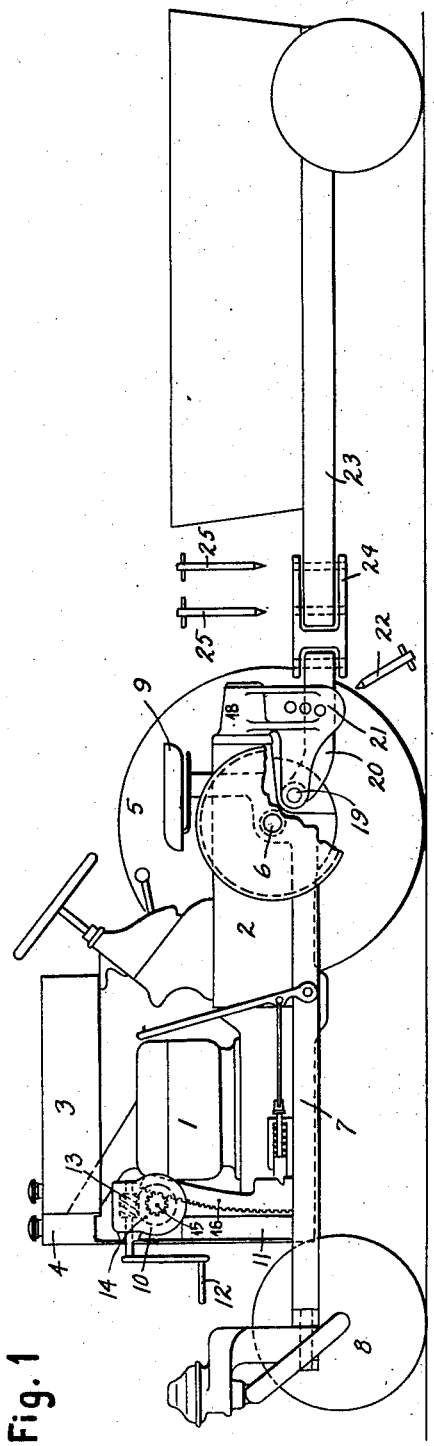
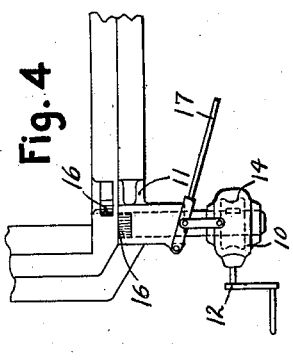
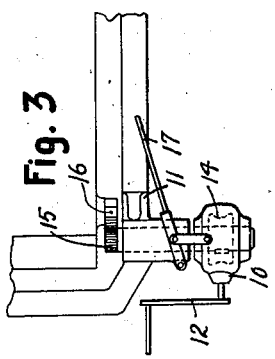
INVENTOR
LEON DUFOUR,
BY
ATTORNEY Oct. 28, 1947.  L. DUFOUR  2,429,711
AGRICULTURAL TRACTOR OR VEHICLE
Filed Jan. 23, 1946  2 Sheets-Sheet 2

INVENTOR
LEON DUFOUR,
BY
ATTORNEY

Patented Oct. 28, 1947

2,429,711

UNITED STATES PATENT OFFICE 2,429,711

AGRICULTURAL TRACTOR OR VEHICLE

Léon Dufour, Geneva, Switzerland

Application January 23, 1946, Serial No. 642,821
In Switzerland April 3, 1945

4 Claims. (Cl. 280—33.44)

In my co-pending application Serial No. 531,636, filed April 18, 1944, are described a number of devices relating to an agricultural tractor or road vehicle provided with two parts hinged relatively to one another on the axis of the rear wheels or on an axis parallel and very near thereto, one of these parts, including the engine and the speed gear box, being capable of rocking relatively to the other which includes the stationary chassis of the tractor and the front directing wheel or wheels, the rocking part being capable of being held in the rocked position by means of a draw bar hinged thereto near the rear axle, this bar being capable of being fixedly secured to a rearward extension of the rocking part and also capable of being coupled rigidly in the vertical plane to the pole of the trailed vehicle.

These described devices are for the purpose of raising within a predetermined angle the rocking part of the tractor relatively to its stationary chassis and are located at the rear of the oscillating part. It results that these mechanisms must be robust and consequently heavy and expensive, as they act on the short lever arm of the rocking part for lifting the engine located at the front of the long lever arm formed by the clutch and speed gear boxes forming the front body of the rocking part of the tractor.

The present invention relates to a lifting device located at the front of the tractor and acting directly on the front end of the rocking part, in combination with a particular construction of draw bar. The lifting device acting on the long lever arm of the rocking part may be made lighter in weight and is consequently less expensive than the mechanisms described in the co-pending application Serial No. 531,636.

The device forming the subject of the invention is provided at the front of the tractor with a manually operated mechanism enabling the front of the rocking part to be raised manually relatively to the stationary part of the tractor.

Figs. 1 to 4 show by way of example a lifting mechanism according to the invention, applied to a tractor with a rocking part, attached to a trailer with one axle.

Fig. 1 is a side view, in elevation of such a tractor, taken at the moment at which it is being coupled to the trailer.

Fig. 2 is a side view, in elevation of the same tractor, after the trailer has been coupled, and the rocking part has been raised.

Figs. 3 and 4 are plan views of a detail of the lifting mechanism.

Figure 2:
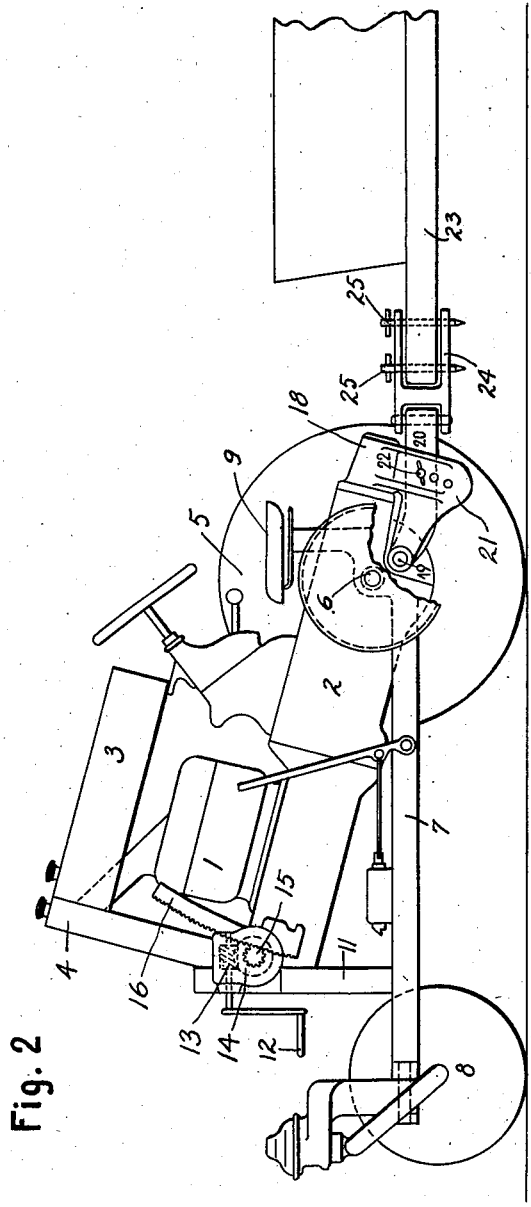

In all the figures, 1 is the engine, 2 the speed gear box, containing all the mechanism for transmitting the power of the engine to the rear driving wheels 5. 3 is the fuel tank and 4 the radiator. The parts 1, 2, 3 and 4 form the rocking part of the tractor, which can rock about the axis 6 of the driving wheels. 7 indicates the chassis, or the stationary part of the tractor which at the front supports the directing wheels 8 and at the rear the driver's seat 9. 10 is a box secured to a support 11 secured to the chassis 7. This box contains the lifting mechanism, of which the crank is seen at 12, and in broken lines, in the interior of the box, the worm 13, the worm wheel 14 and the pinion 15 which gears with a rack 16 secured to the end of the engine, that is to say of the rocking part. These members are shown in greater detail in Figs. 3 and 4. In practice, this mechanism should be capable of being declutched easily that is to say set out of operation. For this purpose there is seen in the last two figures a lever 17 which enables the pinion 15 to be engaged with (Fig. 3) or disengaged from (Fig. 4) the rack 16. The rack 16 is cut in a steel arcuate bar having its centre on the axis 6 of the rear wheels, which is the rocking axis of the rocking part.

At the rear of the tractor, 18 is a part rigidly secured to the rocking part and forming a rearward extension of the rocking part. The part 18 carries a shaft 19 parallel and near to the rocking axis 6. About the axis 19 is hinged the draw bar 20 of the tractor. This bar passes between two lateral cheeks 21 of the part 18 and it can be locked between these cheeks by the pin 22 which passes through one of pairs of holes drilled in the said cheeks 21 and through a hole drilled in the draw bar in a manner similar to the device shown in Fig. 7 of the co-pending application Serial No. 531,636. The two cheeks 21, enclosing the draw bar to the left and right are capable of absorbing lateral forces to which the bar may be subjected during steering.

For attaching the trailer, the procedure is first to fit the pole 23 of the trailer into the rear part 24 of the draw bar as shown in Fig. 1, then the pole is secured rigidly in position by means of two pins 25, as shown in Fig. 2. Thereupon the front of the rocking part is raised through the desired angle by means of the lifting mechanism located at the front of the tractor.

When the desired angle has been reached, the draw bar 20 is secured to the cheeks 21 of the part 18 by inserting the pin 22 into the respective holes of these cheeks and the draw bar. The trailer is then connected correctly to the tractor, the pole of the trailer being coupled rigidly in the vertical plane to the rocking part of the tractor suitably rocked as shown in Fig. 2. It now only remains for the driver to pull the lever 17 outwardly (Fig. 4) for disengaging the pinion 15 from the rack 16. The driver can then set the tractor in operation as now only two axles of the tractor-trailer assembly are connected together rigidly in the vertical plane, whilst the third axle—the front axle of the tractor—can follow freely irregularities of the road independently of the other two. Instead of the box 10, with its members, being secured to the support 11 rigidly mounted on the chassis, it may be mounted on the rocking part, the rack 16 being then secured to the support 11 or to the chassis 7.

I claim:

1. In an agricultural tractor or vehicle having rear wheels, the combination with two parts capable of rocking relatively to one another about the axis of said rear wheels or about an axis parallel to and very near said axis, one of said parts including an engine and a speed gear box and being capable of rocking relatively to the other part, said other part including a stationary chassis and a front directing wheel or wheels, a rearward extension on said rocking part, a draw bar hinged to the rocking part near to the axis of said rear wheels, said draw bar being capable of being secured rigidly to said extension and being adapted to hold said rocking part in the rocked position, said draw bar being also capable of being coupled rigidly in a vertical plane to a pole of a trailer, of a manually actuated mechanism located at the front of the tractor, said mechanism enabling the front end of the rocking part to be raised manually relatively to said chassis.

2. An agricultural tractor or vehicle according to claim 1, wherein said manually actuated mechanism comprises a worm, an operating crank connected to said worm, a worm wheel gearing with said worm, a shaft on which said worm wheel is mounted, a toothed pinion on said shaft, and an arcuate rack gearing with said pinion, said rack having its centre of curvature at the hinge point of the said rocking part, the arrangement being such that when actuating the crank, the front of the rocking part is raised relatively to the said chassis.

3. An agricultural tractor or vehicle according to claim 1, wherein said manually actuated mechanism comprises a worm, an operating crank connected to said worm, a worm wheel gearing with said worm, a shaft on which said worm wheel is mounted, a toothed pinion on said shaft, and an arcuate rack gearing with said pinion, said rack having its centre of curvature at the hinge point of the said rocking part, and means for disengaging the manually actuated mechanism after the draw bar has been coupled rigidly to the pole of the trailed vehicle and has been secured rigidly to the rearward extension of the rocking part after said rocking part has been raised into the rocked position.

4. An agricultural tractor or vehicle according to claim 1, wherein said rearward extension comprises two cheeks, each of said cheeks having a plurality of holes therein, the holes of one cheek being in register with the holes in the other cheek, said cheeks engaging with opposite sides of said draw bar so as to form bearing points therefor when urged laterally by the trailed vehicle whilst the tractor is being steered, said draw bar having a hole therein, said last mentioned hole being adapted to be brought into a position to register with registering holes in the said cheek, and a pin engaging said registering holes.

LÉON DUFOUR.

REFERENCES CITED

The following references are of record in the file of this patent:

UNITED STATES PATENTS

| Number | Name | Date |
| --- | --- | --- |
| 1,565,832 | Waterman | Dec. 15, 1925 |
| 2,035,150 | Dufour | Mar. 24, 1936 |